(12) United States Patent
Hannuksela et al.

(10) Patent No.: US 6,611,561 B1
(45) Date of Patent: Aug. 26, 2003

(54) VIDEO CODING

(75) Inventors: Miska Hannuksela, Tampere (FI); Ari Hourunranta, Tampere (FI)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/506,277

(22) Filed: Feb. 17, 2000

(30) Foreign Application Priority Data

Feb. 18, 1999 (GB) ............................................. 9903676

(51) Int. Cl.[7] ................................................ H04N 7/12
(52) U.S. Cl. .............................. 375/240.27; 375/240.25
(58) Field of Search ...................... 375/240.25, 240.26, 375/240.27, 240.24; 348/425.2, 425.1, 425.3, 420.1; 382/233, 239

(56) References Cited

U.S. PATENT DOCUMENTS

| | | | | |
|---|---|---|---|---|
| 5,228,028 A | * | 7/1993 | Cucchi et al. ............... | 370/392 |
| 5,455,629 A | * | 10/1995 | Sun et al. ............... | 375/240.27 |
| 5,528,284 A | | 6/1996 | Iwami et al. ............ | 348/14.15 |
| 5,680,322 A | | 10/1997 | Shinoda ....................... | 714/18 |
| 5,737,022 A | * | 4/1998 | Yamaguchi et al. ........ | 348/416 |
| 5,768,533 A | | 6/1998 | Ran ............................ | 709/247 |
| 5,910,827 A | * | 6/1999 | Kwan et al. ........... | 375/240.27 |
| 6,104,757 A | * | 8/2000 | Rhee .......................... | 375/240 |
| 6,259,736 B1 | * | 7/2001 | Chujoh et al. ......... | 375/240.13 |
| 6,304,295 B1 | * | 10/2001 | Krishnamurthy et al. | 348/420.1 |
| 6,381,282 B1 | * | 4/2002 | Kwan et al. ........... | 375/240.27 |

FOREIGN PATENT DOCUMENTS

| | | | | |
|---|---|---|---|---|
| EP | 0753968 | 1/1997 | ............ | H04N/7/24 |
| EP | 0873016 | 10/1998 | ............ | H04N/7/30 |
| JP | 4170184 | 6/1992 | ............ | H04N/7/13 |
| WO | 9503674 | 2/1995 | ............ | H01N/7/26 |
| WO | 9611457 | 4/1996 | ............ | H04N/7/12 |

OTHER PUBLICATIONS

E. Steinbach, et al., "Standard Compatible Extension of H.263 for Robust Video Transmission in Mobile Environments" IEEE Transactions on Circuits and Systems for Video Technology, vol. 7, No. 6, Dec. 1997, pp. 872–880.

N. Farber et al, "Extensions of ITU–T Recommendation H.324 for Error–Resilient Video Trransmission" IEEE Communications Magazine, Jun. 1998, pp. 120–128.

Aign, S., "Error concealment, early re–synchronization, and iteractive decoding for MPEG–2", International Conference on Communications, vol. 3, pp. 1654–1658, Jun. 1997.*

Wada, M., "Service recovery of video packet loss using error concealment", IEEE Journal on Selected Areas in Communications, vol. 7, Iss. 5, 5, pp. 807–814, Jun. 1989.*

* cited by examiner

*Primary Examiner*—Vu Le
(74) *Attorney, Agent, or Firm*—Antonelli, Terry, Stout & Kraus, LLP

(57) ABSTRACT

A methodic and apparatus for video decoding including receiving encoded video data; decoding the video data to form decoded video data and determining if the decoded the video data contains an error. When it is determined that an error is present, a message is sent to a transmitting video encoder requesting an update of at least the portion of the video data containing the error, wherein the update message is only sent if a pre-determined period has elapsed since a previous update message was sent. A complementary encoder is also described.

42 Claims, 9 Drawing Sheets

VIDEO CODING

BACKGROUND OF THE INVENTION

This invention relates to video coding.

One of the recent targets in mobile telecommunications has been to increase the speed of the data transmission in order to enable multimedia services via radio networks. One of the key components of multimedia is digital video. Digital video offers a great many advantages over traditional analogue systems, supporting services such as video telephony and multi-media applications. However, a key problem of digital video when compared with analogue systems is the demand it places on communications and storage resources. For example, a bandwidth of approximately 160 Mbps is required in order to transmit broadcast quality video, which compares with a bandwidth of approximately 5 MHz for comparable quality analogue video. Thus, to be able to use digital video the digital signal requires reduction of the quantity of data.

Transmission of video comprises a continuous traffic of data representing moving pictures. As is generally known, the amount of data needed to transfer pictures is high compared to many other types of media, and so far usage of video in low bit-rate terminals has been negligible. However, significant progress has been achieved in the area of low bit-rate video compression. Acceptable video quality can be obtained at bit-rates around 20 kilo bits per second.

As a result of this progressive reduction in bit-rate, it is expected that video is shortly going to become a viable service to offer limited bandwidth networks such as public switched telephone networks (PSTNs) and mobile telecommunications networks. In videophone applications using fixed networks, errors are typically overcome by re-transmitting data. However mobile telephony is prone to higher error rates than the PSTN and has longer round-trip delays. These longer delays make it impracticable to use retransmission with real-time mobile videophone applications. Retransmission is also ineffective in high error rate situations.

A video sequence consists of a series of still images or frames. Data reduction is achieved by using compression techniques to remove redundant data while still retaining sufficient information to allow the original image to be reproduced with an acceptable quality. There are two main types of redundancy in video signals: spatial and temporal. For the coding of images, techniques which exploit spatial redundancy only are termed intra-frame or I frames (i.e. they treat each frame separately), while those which exploit temporal redundancy are termed inter-frame or P frames (i.e. they exploit similarities between frames). The latter invariably also exploit spatial redundancy e.g. by generating motion compensation data which describes the motion (i.e. displacement) between similar areas of the current and a previous image. In the inter frame case, the predicted (motion-compensated) image is rarely precise enough and therefore a spatially compressed prediction error image is also associated with each inter frame.

However, sufficient compression cannot usually be achieved by just reducing the redundancy of the sequence. Thus, video encoders try to reduce the quality of those parts of the video sequence which are subjectively the least important. In addition, the redundancy of the encoded bitstream is reduced by means of efficient lossless coding of compression parameters and coefficients. The main technique is to use variable length codes in which each value is coded using a unique codeword. The shortest codewords are allocated to those values, which statistically occur most often.

Several video coding techniques have been developed. These include run length coding, conditional replenishment, transform coding, Huffman coding and differential phase code modulation (DPCM). Many of these are utilised in key standards such as ITU-T Recommendations JPEG, MPEG-1 and MPEG-2, and H.261/H.263. JPEG defines the form of compressed data streams for still images; MPEG/MPEG2 are for compression of moving pictures; H.261/H.263 have primarily been defined for video telephony applications employing low bit rate communications links (of the order of tens of kbit/s). Current video telephony systems have primarily been designed for use in PSTN or packet networks, and are governed by ITU-T recommendations H.324, which covers low bit rate multimedia communication, H.245 which covers transmission protocols, H.233 which relates to multiplexing and H.323, which covers video conferencing over traditional shared media local area networks. The first mobile videophones will be based on H.324.

Compressed video is easily corrupted by transmission errors, mainly for two reasons. Firstly, due to utilisation of temporal predictive differential coding (inter frames), an error is propagated both spatially and temporally. In practice, this means that once an error occurs, it is easily visible to the human eye for a relatively long time. Especially susceptible are transmissions at low bit-rates where there are only a few intra-coded frames (the transmission of intra-coded frames would stop the temporal error propagation). Secondly, the use of variable length codes increases the susceptibility to errors. When a bit error alters the codeword, the decoder will lose codeword synchronisation and also decode subsequent error-free codewords (comprising several bits) incorrectly until the next synchronisation (or start) code. A synchronisation code is a bit pattern which cannot be generated from any legal combination of other codewords and such codes are added to the bit stream at intervals to enable re-synchronisation.

Every bit in a compressed video bitstream does not have an equal importance to the decompressed images. Some bits belong to segments defining vital information such as picture type (e.g. intra or inter), quantiser value and optional coding modes that have been used. In H.263, the most vital information is gathered in the picture header. A transmission error in the picture header typically causes a total misinterpretation of the subsequent bits defining the picture content. Due to utilisation of temporal predictive differential coding (inter frames), the error is propagated both spatially and temporally. Thus, when a decoder detects a corrupted picture header, a typical approach is to freeze the previous picture on the screen, to send an intra picture request to the transmitting terminal and to wait for the requested intra frame. This causes an annoying pause in the received video.

Transmission errors have a different nature depending on the underlying network. In packet-switched networks, transmission errors are typically packet losses (due to congestion in network elements). In circuit-switched networks, transmission errors are typically bit errors where a '1' is corrupted to '0' or vice versa and, in radio communications networks, errors may occur in bursts making the situation even more difficult.

To impede degradations in images introduced by transmission errors, retransmissions can be used (as described above), error detection (e.g. Cyclic Redundancy Checking (CRC)) and/or error correction methods can be applied, and/or effects from the received corrupted data can be concealed. In fixed networks retransmission provides a reasonable way to protect video data streams from errors since Bit Error Rates (BER) are typically in the region of $10^{-6}$. However large round-trip delays associated with low bit-rate radio transmission and moderate or high error rates (e.g. $10^{-4}$ to $10^{-3}$) make it impracticable to use retransmission, especially with real-time radio videophone applications. Error detection and correction methods usually require large overheads in terms of the data that must be transmitted and memory/processing capability required. Consequently, for low bit-rate applications, error concealment may be considered the preferred way to protect and recover images from transmission errors. Video error concealment methods are typically applicable to transmission errors occurring through packet loss and bit corruption.

H.263 is an ITU-T recommendation for video coding for low bit-rate communication, which generally means data rates below 64 kbps. The recommendation specifies the bitstream syntax and the decoding of the bitstream. Currently, there are two versions of H.263. Version 1 consists of the core algorithm and four optional coding modes. H.263 version 2 is an extension of version 1 providing twelve new negotiable coding modes.

Pictures are coded as luminance (Y) and two colour difference (chrominance) components ($C_B$ and $C_R$). The chrominance pictures are sampled at half the resolution of the luminance picture along both co-ordinate axes. Picture data is coded on a block-by-block basis, each block representing 8×8 pixels of luminance or chrominance.

Each coded picture, as well as the corresponding coded bitstream, is arranged in a hierarchical structure with four layers, which are from bottom to top: block layer, macroblock layer, picture segment layer and picture layer. The picture segment layer can either be arranged as a group of blocks (GOB) or a slice.

Block layer data consists of uniformly quantised discrete cosine transform coefficients, which are scanned in zigzag order, processed with a run-length encoder and coded with variable length codes.

Each macroblock relates to 16×16 pixels of luminance and the spatially corresponding 8×8 pixels of chrominance components. In other words, a macroblock consists of four 8×8 luminance blocks and the two spatially corresponding 8×8 colour difference blocks. Each inter macroblock is associated with motion compensation data comprising a motion vector which defines the position of a corresponding area in the reference frame which most closely resembles the pixels of the inter macroblock. The inter macroblock data comprises coded prediction error data for the pixels of the macroblock.

Usually, each picture is divided into groups of blocks (GOBs). A group of blocks (GOB) typically comprises a row of macroblocks. Data for each GOB consists of an optional GOB header followed by data for the macroblocks within the GOB.

If the optional slice structured mode is used, each picture is divided into slices instead of GOBs. A slice contains a number of consecutive macroblocks in scan-order. Data for each slice consists of a slice header followed by data for the macroblocks of the slice.

The picture layer data contain parameters affecting the whole picture area and the decoding of the picture data. The coded parameter data is arranged in a so-called picture header.

Picture and GOB (or slice) headers begin with a synchronisation code. No other code word or a legal combination of code words can form the same bit pattern as the synchronisation codes. Thus, the synchronisation codes can be used for bitstream error detection and for resynchronisation after bit errors. The more synchronisation codes that are added to the bitstream, the more error-robust the system becomes.

Most known error concealment techniques are based on spatial and temporal interpolation schemes. Spatial interpolation is used in intra frames and intra-coded areas of inter frames. Spatial interpolation means that lost areas are interpolated from spatially neighbouring areas. This can be done for example using the distance weighted average of the boundary pixels.

Error concealment using temporal interpolation is more often used in low bit-rate video coding, since the number of intra frames is usually rather low. A very basic temporal interpolation scheme copies the lost areas from the same positions of the previous frame, i.e., it treats the lost blocks as "not coded" blocks. In more advanced schemes, motion compensation is performed using either the median or average of the motion vectors of spatially neighbouring blocks. There have also been some proposals to use boundary pixel matching to find best motion vectors for the lost block.

In low resolutions and at low bit-rates, the correlation between spatially neighbouring blocks is often rather low. Thus interpolated motion vectors based on spatially neighbouring pixel data may be far from the original values. This means that uni-directional concealment schemes often fail to reconstruct the original blocks. Furthermore, if only motion vectors are used for concealment without trying to recover the prediction error blocks, the picture becomes blurred, since a great amount of detail will be lost. In practice, using current concealment schemes, errors or incorrectly concealed blocks are visible for a relatively long time.

The term codec refers to the ability to both encode and decode. Video coding parameters of the algorithm controlling encoding in the video codec are normally pre-selected on the basis of the environment in which they are designed to operate. This is particularly beneficial for transmission over channels, which are prone to error. In such conditions the coding parameters are selected so as to attempt to minimise the affect of transmission errors on the picture quality. Where errors occur in transmission, the resulting decoded video normally produces additional blockiness, annoying green and pink squares, temporal jerkiness and sometimes chequered patterns.

In existing systems, two parameters which are typically pre-set in the encoding algorithm are the amount of intra-refresh information and frequency of start codes. In PSTN networks, the video codec starts the coding with a full intra-frame. Intra-frame pictures are coded without reference to other pictures which means that they contain all the information necessary for their reconstruction by the decoder and for this reason they are an essential entry point for access to a video sequence. Because the information content of intra-frames is high, the compression rate is relatively low and therefore a full intra-frame requires a significant number of data bits to define the picture. As a result, the transmission of a full intra-frame via low bandwidth channels, even using small buffers to minimise delays, takes large periods of time. This usually results in the decoder freezing the previous picture on the screen for a while, in effect to allow the following picture to catch up. Thus, as an alternative approach, in succeeding pictures portions of the picture are updated (or refreshed) in intra-mode, rather than updating the whole picture at once. Hence the picture is said to be intra-refreshed. Typically this occurs on a macroblock-by-macroblock basis of 16×16 pixels. If the rates at which the macroblocks are refreshed is slow, transmission error artefacts on the image can be perceived for a long time and will vanish only when the erroneous macroblock is intra-refreshed. In error prone networks, it is therefore necessary to increase the number of intra-refresh macroblocks in each frame, or the rate at which full intra frames are sent.

Another technique used to minimise the impact of transmission errors is to reduce the size of affected areas. Since the coded bit stream contains variable length coding (VLC) code words, an error in the bit stream in most cases causes the decoder to lose synchronisation with VLC code words. The decoder can only continue decoding correctly after receiving a start code. Typically, start codes are found at the beginning of coded picture frames; however most video coding standards also allow start codes to be inserted elsewhere in a picture, for instance at the beginning of each row of macro blocks or even more often. Thus, to reduce the size of the areas affected by transmission errors, start codes can be introduced in the picture at more frequent locations. The density of these start codes is a compromise between reduced picture quality owing to an increased number of start codes, and the size of the area which is affected by transmission errors. In error prone environments it is advantageous to sacrifice some visual image quality in order to reduce the image area affected by transmission areas.

The overall current approach is to pre-program the intra-refresh information and start code parameters into the algorithm controlling the video encoder depending on the anticipated level of transmission errors. Intra-refresh data and start codes are reasonably effective for mitigating the effects of predictable transmissions errors, but these approaches have certain shortcomings. Principally, these shortcomings stem from the fact that actual transmission errors are not always predictable, and in situations where there is a wide margin between the predicted transmission error and the actual transmission error, the intra-refresh and start code parameters will not be consistent with the required level for these encoding parameters. For example, if the transmission errors are less than anticipated then the level of intra-refresh data or start code repetition will be in excess of that required, and the excess will thus be redundant. On the other hand, if the transmission errors are much worse than those predicted, then the intra-refresh and start code information will be insufficient, and spread so widely both temporally and spatially in the decoded pictures that the result will be poor image quality.

In known H.324 multimedia terminals, it is possible to send various commands from a receiving decoder to a transmitting encoder via the H.245 control protocol. One command is videoFastUpdatePicture which the decoder requests the encoder to enter the fast update mode at its earliest convenience and update the entire picture. The protocol does not define how the encoder is to carry out the updating. The protocol also defines the command videoFastUpdateGOB which requests the encoder to enter the fast update mode at its earliest convenience and update the entire GOB; and videoFastUpdateMB which requests the encoder to enter the fast update mode at its earliest convenience and update the entire Macroblock. Thus the decoder can identify the picture, GOB or macroblock to be updated.

In a basic implementation, a multimedia terminal that conforms to H.324 will send an videoFastUpdatePicture command every time and error is detected. Similarly a videoFastUpdateGOB command is sent for every corrupted GOB.

According to H.245 the requesting terminal requires an acknowledgement from the encoder for each message sent and, if the acknowledgement is not sent in time, the decoder will transmit the message again. This means that the control channel can become very congested with repeated commands.

In H.263 Appendix 1 a feedback mechanism called Error Tracking is introduced in which the H.245 protocol is used to transmit indications as to which macroblocks of a frame are received corrupted. The video encoder keeps track of prediction errors in the past Z frames. Based on the H.245 indications and the prediction error counters, the video encoder can decided which macroblocks it will update in intra-mode.

A third known feedback video transmission system is defined in H.263 Annex N. This is known as Reference Picture Selection mode. This defines ways for a video decoder to indicate which picture segments (GOB or slices) were corrupted and, based on this information, the video encoder can encode the corrupted parts using older frames instead of the latest one. The decoder sends a negative acknowledgement (NACK) for every corrupted picture segment. Thus, if a whole picture is corrupted, a NACK for every segment will be corrupted. Alternatively the decoder can send positive feedback i.e. which segments have been received uncorrupted and the encoder can use only those uncorrupted areas for prediction.

SUMMARY OF THE INVENTION

According to a first aspect of the invention there is provided a method of video decoding comprising receiving encoded video data by a video decoder, decoding said video data to form decoded video data representing successive pictures of a video sequence, determining if the decoded video data contains an error and, when it is determined that an error is present, sending a message to a transmitting video encoder requesting an update of at least the portion of the video data containing the error wherein said update message is only sent if a pre-determined period has elapsed since a previous update message for a corresponding portion of the video data was sent.

The update message may request the update of an entire picture of the video sequence. Additionally or alternatively, the update message may request the update of a segment of a picture of the video sequence.

Preferably the predetermined period is proportional to the round-trip delay between the video decoder and the video encoder. Advantageously, the pre-determined period is twice the round-trip delay.

According to a second aspect of the invention, a step of determining if the video contains an error comprises determining the amount of change in the video data as compared with previous picture data for a corresponding area of a video image.

According to a third aspect of the invention a step of determining if the video contains an error comprises determining the amount of motion in a previous picture exceeds a pre-determined threshold.

According to a fourth aspect of the invention, a method of video decoding comprises receiving encoded video data by a video decoder, decoding said video data to form decoded video data representing successive pictures of a video sequence, determining if the decoded video data contains an error and, when it is determined that an error is present, sending a message to a transmitting video encoder requesting an update of at least the portion of the video data containing the error wherein the step of determining if the decoded video contains an error comprises determining for an area of a first picture the amount of change in the video data as compared with video data for a corresponding area of a previous picture, the update message being sent if the amount of change exceeds a pre-determined threshold.

According to a further aspect of the invention, a method of video decoding comprises receiving encoded video data by a video decoder, decoding said video data to form decoded video data representing successive pictures of a video sequence, determining if the decoded video data contains an error and, if so, concealing an area of the picture containing the error, and, when it is determined that an error is present, generating a message to a transmitting video encoder requesting an update of at least the portion of the video data containing the error wherein the update message is sent if the number of areas of the picture that have been concealed is less than a pre-determined threshold.

According to a further aspect of the invention, a method of video decoding comprises receiving encoded video data by a video decoder, decoding said video data to form decoded video data representing successive pictures of a video sequence, determining if the decoded video data contains an error and, if so, concealing an area of the picture containing the error, and, when it is determined that an error is present such that a picture cannot be decoded, all the parts of the picture are labelled as being concealed and the next picture is decoded.

The invention also relate to a method of encoding a video signal comprising receiving a video signal to be encoded; encoding the video signal to form encoded video data; and transmitting the encoded video data to a remote video decoder, wherein the encoding is responsive to an update control signal received from the remote video decoder to update requested encoded video data in a progressive manner over a plurality of pictures.

Preferably the updating is carried out on a macroblock-by-macroblock basis, the updated macroblocks being updated over sequential pictures of the video signal.

According to a further aspect of the invention, video decoding apparatus comprises means for receiving encoded video data; means for decoding said video data to form decoded video data means for determining if the decoded video data contains an error and means for sending a message to a transmitting video encoder requesting an update of at least the portion of the video data containing the error, wherein the apparatus is arranged to send the update message only if a pre-determined period has elapsed since a previous update message was sent for a corresponding portion of the video data.

Preferably the means for determining if the decoded video contains an error comprises means for determining the amount of change in the video data as compared with previous picture data for a corresponding area of a video image, the update message being sent if the amount of change exceeds a pre-determined threshold.

Advantageously an update message is generated if the amount of motion in a previous picture exceeds a pre-determined threshold.

According to a further aspect of the invention, video signal encoding apparatus comprises means for receiving a video signal to be encoded; means for encoding the video signal to form encoded video data; and means for transmitting the encoded video data to a remote video decoder, wherein the encoding means is responsive to an update control signal received from the remote video decoder to update requested encoded video data in a progressive manner over a plurality of pictures.

Preferably the updating is carried out on a macroblock-by-macroblock basis, the updated macroblocks being updated over sequential pictures of the video signal.

The invention also extends to a mobile radio device.

BRIEF DESCRIPTION OF THE DRAWINGS

The invention will now be described, by way of example only, with reference to the accompanying drawings, in which.

DETAILED DESCRIPTION OF THE INVENTION

Further description of the invention will be made with reference to the H.324 recommendation. However it is not the intention to limit the application of the invention to this and its related protocols.

Figure 1:
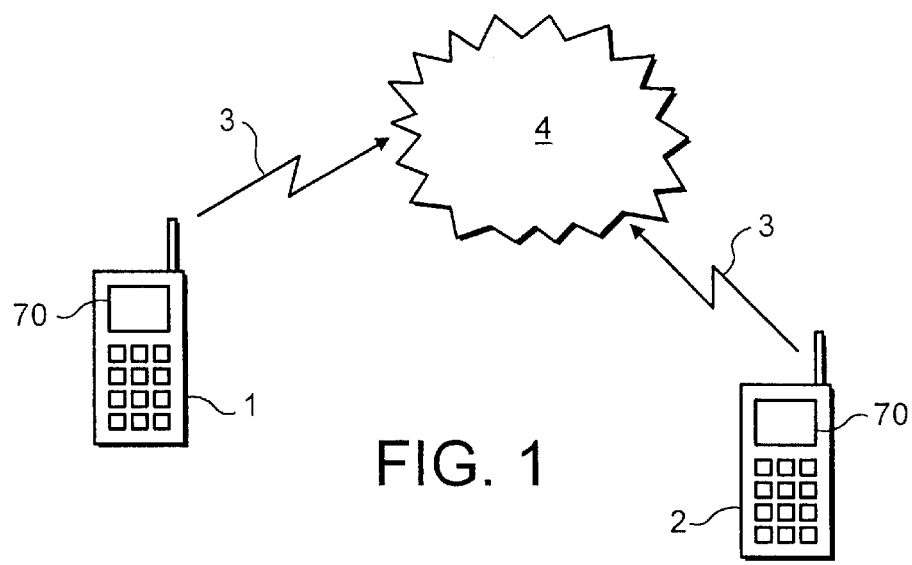
FIG. 1 shows a multimedia mobile communications system.

FIG. 1 shows a typical multimedia mobile communications system. A first multimedia mobile terminal 1 communicates with a second multimedia mobile terminal 2 via a radio link 3 to a mobile communications network 4. Control data is sent between the two terminals 1,2 as well as the multimedia data.

Figure 2:
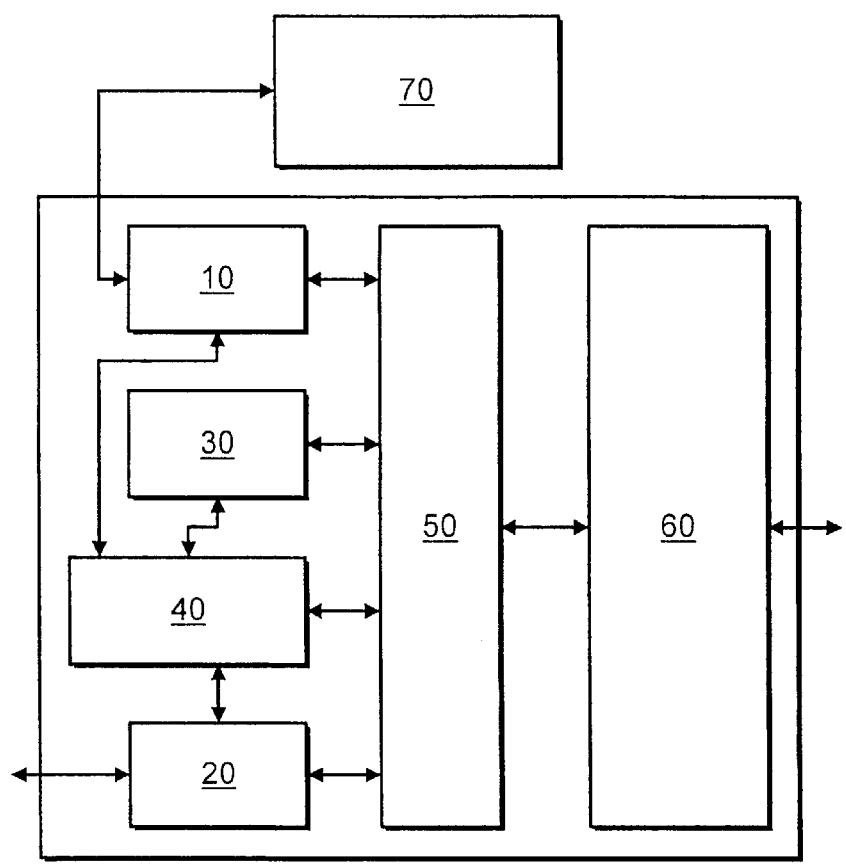
FIG. 2 shows an example of the multimedia components of a multimedia terminal.

FIG. 2 shows the typical multimedia components of a terminal 1 which conforms to H.324. The terminal comprises a video codec 10 conforming to H.263, an audio codec 20 conforming to G.723, a data protocol manager 30 conforming to T.120, a control manager 40 conforming to H.245, a multiplexer/demultiplexer 50 conforming to H.223 and a modem 60 (if the required). The video codec 10 receives signals from a video capture device of the terminal (not shown) (e.g. a camera) for coding and receives signals from a remote terminal 2 for decoding and display by the terminal 1 on a display 70. The audio codec 20 receives signals for coding from the microphone (not shown) of the terminal 1 and receive signals from a remote terminal 2 for decoding and reproduction by speaker (not shown) of the terminal 1.

The control manager 40 controls the operation of the video codec 10, the audio codec 20 and the data protocols manager 30. However, since the invention is concerned with the operation of the video codec 10, no further discussion of the audio codec 20 and protocol manager 30 will be provided.

Figure 3:
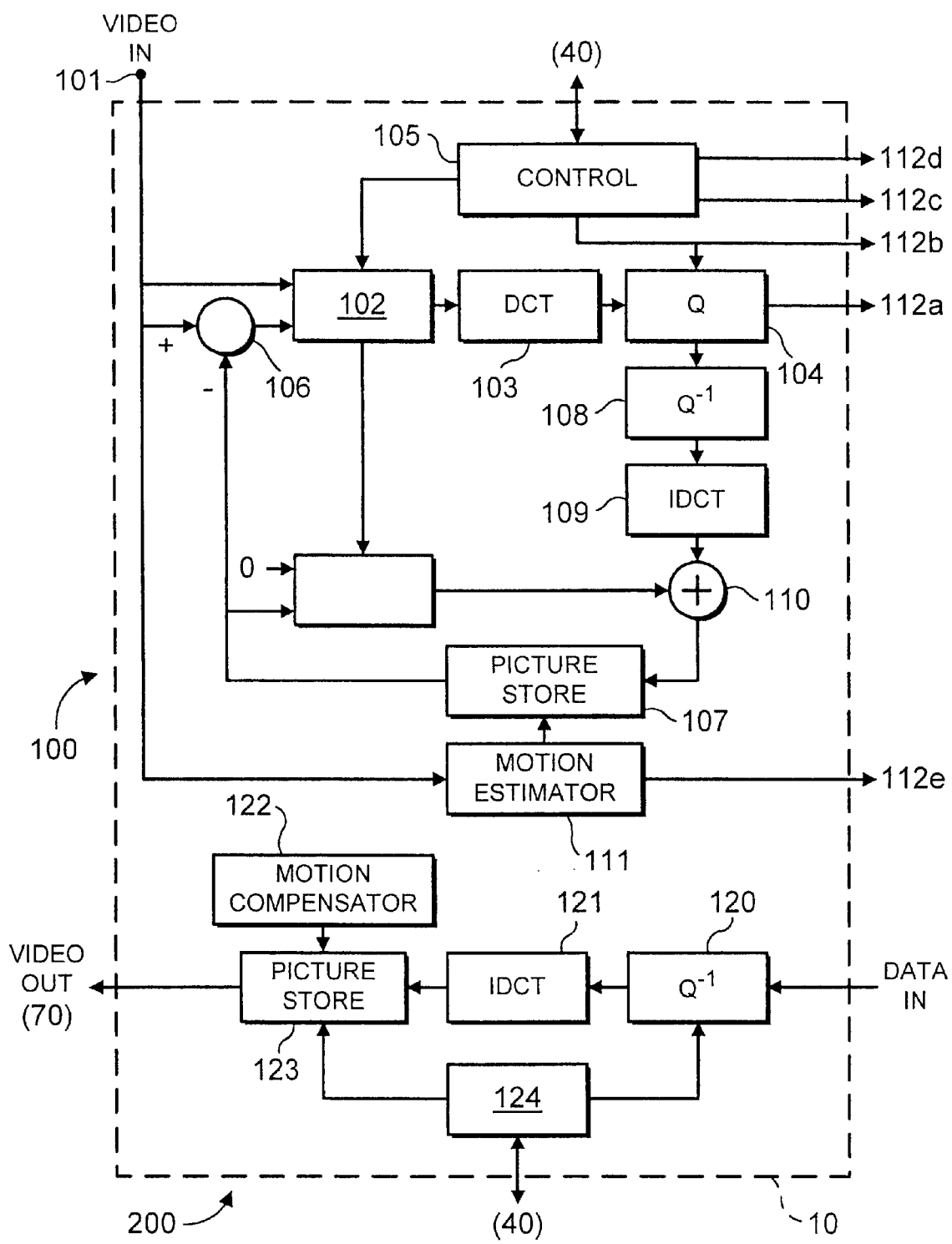
FIG. 3 shows an example of a video codec.

FIG. 3 shows an example of a video codec 10 according to the invention. The video codec comprises an encoder part 100 and a decoder part 200. The encoder part 100 comprises an input 101 for receiving a video signal from a camera or video source (not shown) of the terminal 1. A switch 102 switches the encoder between the intra-mode of coding and the inter-mode.

In intra-mode, the video signal from the input 101 is transformed to DCT co-efficients by a DCT transformer 103. The DCT coefficients are then passed to a quantiser 104 which quantises the coefficients. Both the switch 102 and the quantiser 104 are controlled by an encoding control manager 105 of the video codec which also receives feedback control from the receiving terminal 2 by means of the H.245 control manager 40.

In inter mode, the switch 102 is operated to accept from a subtractor 106 the difference between the signal from the input 101 and a previous picture which is stored in a picture store 107. The difference data output from the subtractor 106 represents the prediction error between the current picture and the previous picture stored in the picture store 107. The data in the picture store 107 is generated by passing the data output by the quantiser through an inverse quantiser 108 and applying an inverse DCT transform 109 to the inverse-quantised data. The resulting data is added to the contents of the picture store 107 by adder 110. A motion estimator 111 may generate motion compensation data from the data in the picture store 107 in a conventional manner.

The video codec outputs the quantised DCT coefficients 112a, the quantising index 112b (i.e. the details of the quantising used), an intra/inter flag 112c to indicate the mode of coding performed (I or P/B), a transmit flag 112d to indicate the number of the frame being coded and the motion vectors 112e for the picture being coded. These are multiplexed together by the multiplexer 50 together with other multimedia signals.

The decoder part 200 of the video codec 10 comprises an inverse quantiser 120, an inverse DCT transformer 121, a motion compensator 122, a picture store 123 and a controller 124. The controller 124 receives video codec control signals demultiplexed from the encoded multimedia stream by the demultiplexer 50. In practice the controller 105 of the encoder and the controller 124 of the decoder may be the same processor.

Considering the terminal 1 as receiving coded video data from terminal 2, the operation of the video codec 10 will now be described with reference first to its decoding role. The terminal 1 receives a multimedia signal from the transmitting terminal 2. The demultiplexer 50 demultiplexes the multimedia signal and passes the video data to the video codec 10 and the H.245 control data to the H.245 control 40. The decoder 200 of the video codec decodes the encoded video data by inverse quantising, inverse DCT transforming and motion compensating the data. The decoded video data is then output for reproduction on a display 70 of the receiving terminal 1. The controller 124 of the decoder checks the integrity of the received data and, if an error is detected, may request an update of the corrupted data from the encoder of the transmitting terminal 2 in a manner to be described below.

Errors in video data may occur at the picture level, the GOB level or the macroblock level. Error checking may be carried out at each level.

Figure 4:
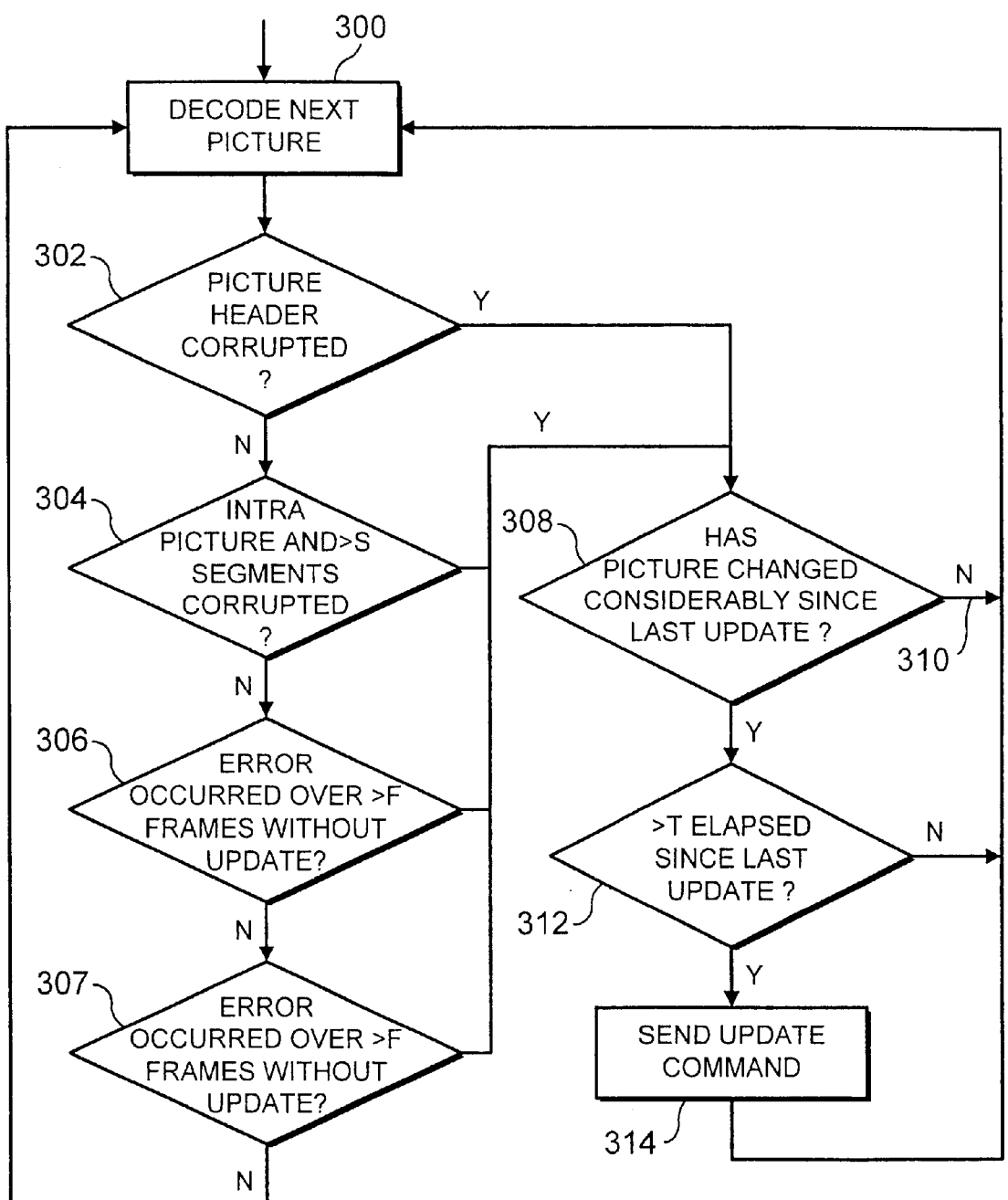
FIG. 4 is a flow diagram showing the operation of a video decoder according to a first embodiment of the invention.

An error at the picture level means that the picture cannot be decoded and is lost completely or it is so corrupted that it is effectively lost. An error at the picture level may be detected in one or more ways. FIG. 4 shows a flow diagram illustrating a method of generating update messages according to a first embodiment of the invention. Firstly (300) the decoder starts to decode a received picture. If the picture header is corrupted (302), or an unlikely parameter is found (e.g. an inter flag is set when the coding type is intra) the picture is deemed to be lost.

Alternatively an error may be detected by determining the type of coding used in the picture and, if the coding type was intra and more than Q segments are determined to be corrupted (304), the picture is deemed to be lost. The segments could comprise GOBs, slices or macroblocks. For example in the QCIF picture format there are 9 GOBs per picture. Therefore a criterion could be set that if say more than 4 GOBs of a picture are corrupted, a picture is deemed to be lost. Whether or not a GOB is corrupted may be determined by CRC.

Alternatively, if the temporal propagation of errors has occurred over more than F pictures (e.g. a MB has not been updated within a set time X) and the concealed area has become larger than a certain threshold without being updated (306), the picture is deemed to be lost. To achieve this, the decoder during decoding keeps track of the status (e.g. concealed/inter/intra) of the macroblocks of the picture and deems the picture to be lost if more than a predetermined number of macroblocks are marked as concealed.

Alternatively, if the current picture N is deemed to be lost, the controller 124 determines (307) whether the frame before the current frame (N−1) contained a lot of motion or a lot of prediction errors. This may be achieved during decoding of the next picture (N+1) by collecting the motion vectors for the next picture (N+1) and calculating the displacement represented for the whole picture. This may be done by calculating the average motion represented by the motion vectors or counting the number of motion vectors associated with the picture. If it is determined that the frame after the current frame did not contain a lot of motion or prediction errors, the next picture is decoded (300). Otherwise it is likely that the current picture is required to produce an acceptable image i.e. the next picture is inter coded and must be predicted from the previously correctly decoded picture.

When an error at the picture level is found, the controller 124 determines (308) if the picture content has changed significantly since the last update of the picture. This may be achieved by generating histograms of the chrominance and/or luminance pixel values of the current frame and a previously successfully-decoded picture and comparing the histograms. Alternatively, the gradient sums of the two picture may be compared. The gradient sum represents, for each picture, the sum of the differences between adjacent pixel luminance values in the x and y directions. If the current picture is deemed to have changed considerably, the controller 124 then determines (312) if more than a period T has elapsed since a previous picture update was sent. If so, a videoFastUpdatePicture message is sent (314) to the transmitting terminal 2. The decoder then proceeds to decode the next picture (300) without waiting for the response from the encoder to the update command.

T is proportional to the round-trip delay of the communication path between the two communication terminals 1,2 which can be measured by the H.245 protocol manager 40. A typical value for T is two times the round trip delay. The value of T is determined to allow for the round-trip delay between the receiving decoder and the transmitting decoder and the time taken by the transmitting encoder to respond to the update commands.

It is not necessary for all the steps 302, 304, 306 and 307 to be carried out: each may be used alone or other methods of error detection may be used.

Figure 5:
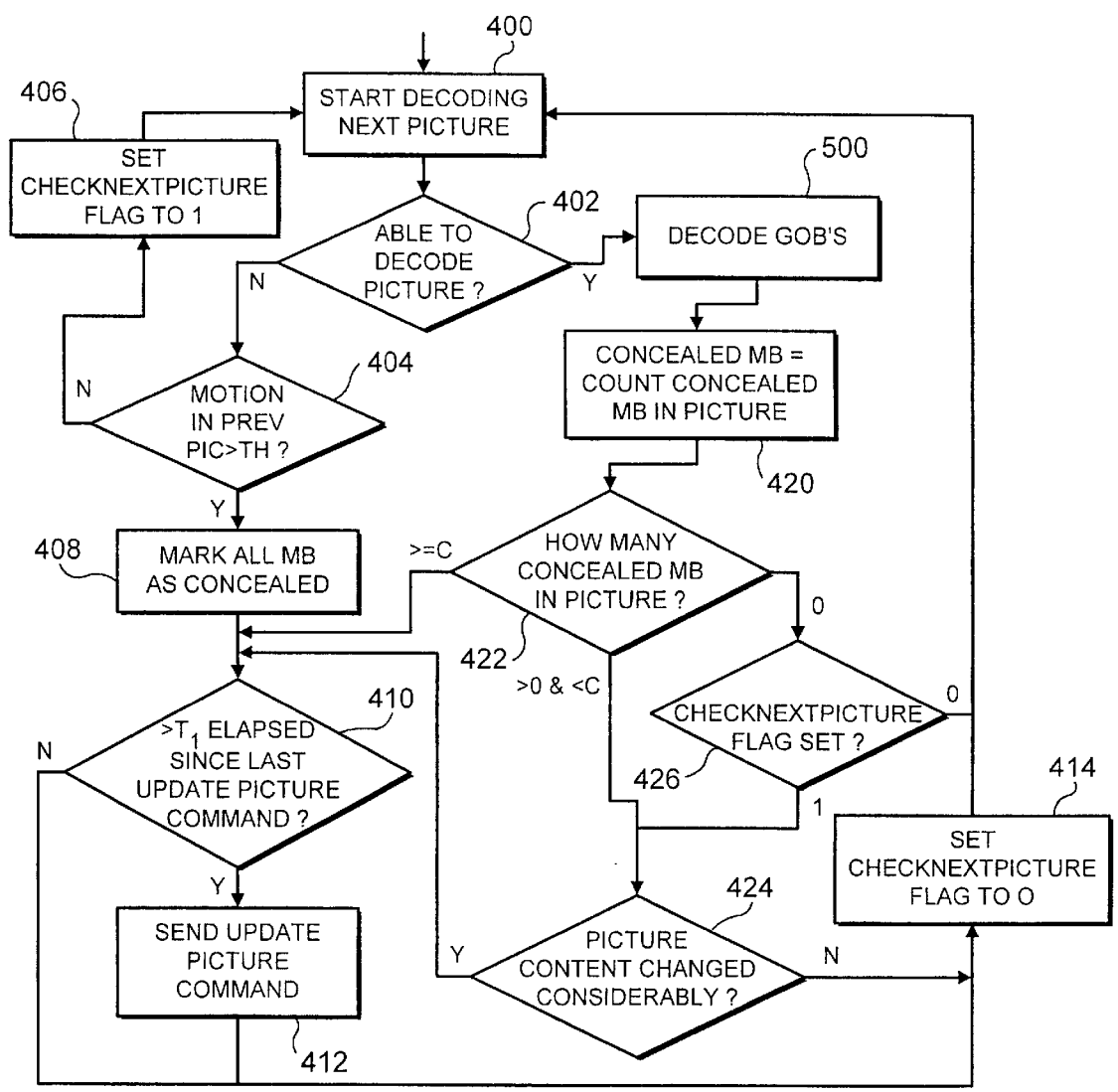
FIG. 5 is a flow diagram showing the operation at the picture level of a video decoder according to the invention.

FIG. 5 is a flowchart showing the operation at a picture level of a decoder according to a second embodiment of the invention. Firstly (400) the next picture N is decoded. If the decoder is unable to decode the picture (402), the picture has the state "lost". The decoder will return this decision when the picture header is irretrievable. In this case, the decoder controller 124 inspects the previous picture (N-m) received and successfully decoded and ascertains the amount of motion in the previous picture (404). This can be achieved for example by calculating the total amount of displacement represented by the motion vectors associated with the MBs of the previous successfully decoded picture (N-m). If this motion is less than or equal to a pre-determined threshold D, a "Check Next Picture" flag is set to 1 (406) and the next picture (N+1) is decoded (400). If the motion is greater than a pre-determined threshold D, the picture is deemed corrupted and all MBs are marked as being corrupted (408). This is achieved by setting the status of all the macroblocks in the picture to "concealed". The controller 124 then determines (410) if more than a period T has elapsed since a previous picture update command was sent. If so, a videoFastUpdatePicture message is sent (412) to the transmitting encoder. In either case, the "Check Next Picture Flag" is set to 0 (414) and the next picture is decoded (400).

$T_1$ may be proportional to the round-trip delay of the communication path between the two communication terminals 1,2, which can be measured by the H.245 protocol manager 40. An appropriate value for $T_1$ is two times the round trip delay.

Figure 6:
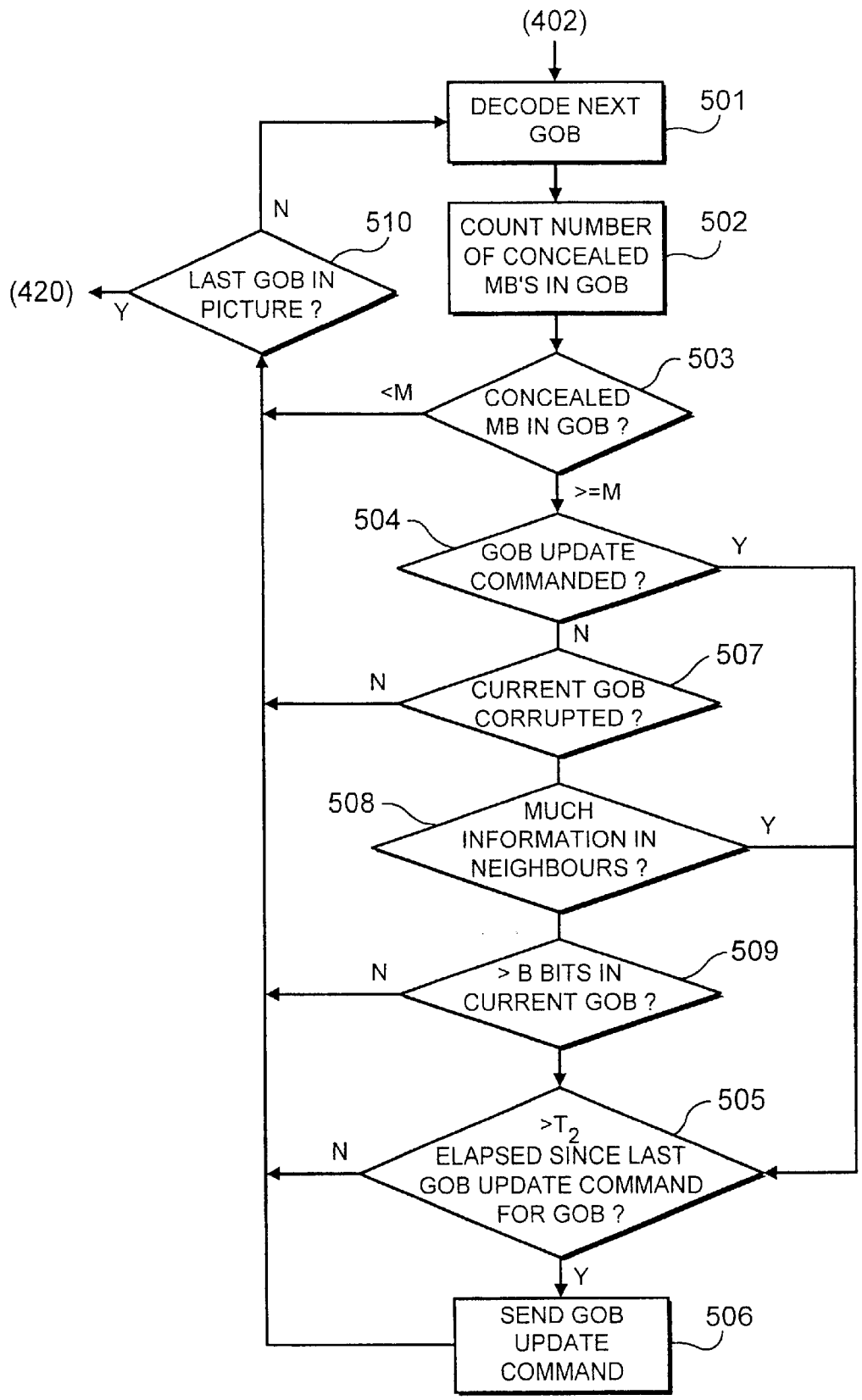
FIG. 6 is a flow diagram showing the operation at the GOB level of a video decoder according to the invention.

If the decoder has managed to decode the picture header data successfully (402), the GOBs of the picture are decoded (500) (see FIG. 6). According to H.263, the inclusion of a GOB header is optional. If omitted, the decoder does not perform any integrity checking at the GOB level and immediately decodes the header and data of the MBs of the GOB.

Figure 7:
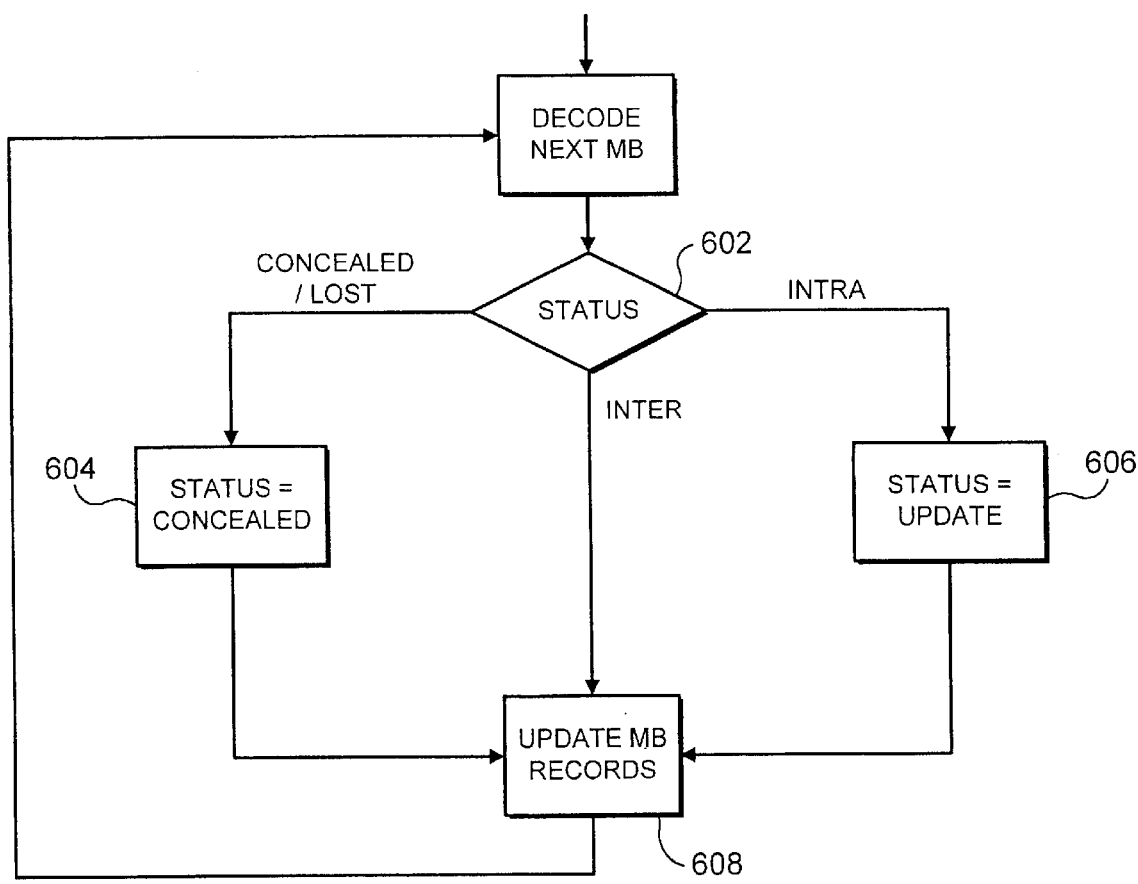
FIG. 7 is a flow diagram showing a macroblock decoding algorithm carried out by a video decoder according to the invention.

As shown in FIG. 7, as each GOB of a picture is decoded the status of each MB of the GOB is determined (602). If a macroblock is corrupted or lost, the MB is concealed using known error concealment techniques and the status of the MB is set to "concealed" (604). For other MBs the decoder determines the type of MB from the macroblock header. For intra-coded MBs the status is set to "update" (606). The controller 124 keeps a record (608) of the status of the MBs for each GOB and each picture. For inter-coded MBs, the status is copied from the corresponding MB of the previous frame that was decoded.

Turning back to FIG. 6, once all the MBs of a GOB have been decoded (as far as the decoder is able), the number of concealed MBs in the GOB being decoded is determined by examining the MB status records (608/502). If the number of concealed MBs is less than a pre-determined threshold M (503) then the next GOB is decoded (501). However if the number of concealed MBs is more than a pre-determined threshold M (503) then the controller 124 checks (504) to see if a GOB update has previously been commanded by the decoder. If an update command has previously been sent, the controller 124 determines (505) if more than a period $T_2$ has elapsed since the previous GOB update was sent. If so, a videoFastUpdateGOB command is sent (506). If not, the next GOB is decoded (501). $T_2$ is also proportional to the round-trip delay of the communication path between the two communication terminals 1,2, which can be measured by the H.245 protocol manager 40. A typical value for $T_2$ is two times the round trip delay.

If no GOB update has previously been sent (504), the controller checks whether the GOB is corrupted (507). This may be ascertained by CRC, bit error rate or inspecting the GOB header (if present). If the GOB is deemed not to be corrupted, the next GOB is decoded (501). If the GOB is deemed to be corrupted, the neighbouring (e.g previous GOBs) are examined (508) to see if they included a lot of intra-coded MBs. If so, it is likely that the current corrupted GOB also included a lot of intra-coded MBs. The controller 124 then determines (505) if more than a period $T_2$ has elapsed since the previous GOB update was sent. If so, a videoFastUpdateGOB is sent (506). If not, the next GOB is decoded (501). If it is determined that the neighbouring GOBs did not include a lot of intra-coded MBs, then the number of bits in the current GOB are counted (509) and compared with a threshold B. Typically a QCIF GOB consists of around 200 bits and a typical value for B may be 500 bits. If the number of bits in the GOB exceeds the threshold B then the controller 124 determines (505) if more than a period $T_2$ has elapsed since the previous GOB update was sent. If so, a videoFastUpdateGOB is sent (506). If not, the next GOB is decoded (501). If the number of bits does not exceed a threshold B, the next GOB is decoded (501). This process continues until the last MB of the last GOB of a picture has been decoded (510) at which point the decoding process continues at step 420 of FIG. 5.

Thus several GOB update commands may be sent for a single picture. A separate timer is maintained for each GOB of the picture and a GOB update command is only more than time $T_2$ has elapsed since a GOB update command for that GOB of a picture has been sent. For example, after decoding picture N, say update commands for GOBs 1 and 5 were sent. On decoding picture N+1, even if GOBs 1 and 5 are found to be corrupted, GOB update commands for these GOBs are time not sent because the period $T_2$ has not elapsed since an update command in respect of these GOBs was previously sent.

Once all the GOBs of a picture have been decoded (500), the total number of concealed MBs is determined (420) from the MB status records (608). If the number of concealed MBs is determined (422) to be greater than a threshold C then the controller 124 determines (410) if more than a period $T_1$ has elapsed since a previous picture update was sent. If so, a videoFastUpdatePicture message is sent (412) to the transmitting encoder and the next picture is decoded (400). In either case, the "Check Next Picture Flag" is set to 0 (414).

If the number of concealed MBs in the picture is determined (422) to be less than C but greater than zero, the controller 124 determines (424) if the current picture has changed considerably. This may be achieved in a conventional manner e.g. by comparing the histograms of the current frame and a previous frame that was successfully decoded and/or comparing the gradient sums of the two frames. If the current picture is deemed to have changed considerably, the controller 124 then determines (410) if more than a period $T_1$ has elapsed since a previous picture update was sent. If so, a videoFastUpdatePicture message is sent (412) to the transmitting terminal 2. If the current picture is not deemed to have changed considerably, the "Check Next Picture Flag" is set to 0 (414) and the next picture is decoded (400).

If the number of concealed MBs in the picture is determined (422) to be zero, the "Check Next Picture" Flag is checked (426). If the flag is not set (i.e.=0), the next picture is decoded (400). However if the flag is set (i.e.=1) this means that the previous picture (N−1) was lost. The current picture (N) is therefore compared with the previously successfully decoded picture (N-n) (where n is an integer greater than 1) and the change in picture content is determined (424) as described before.

Figure 8:
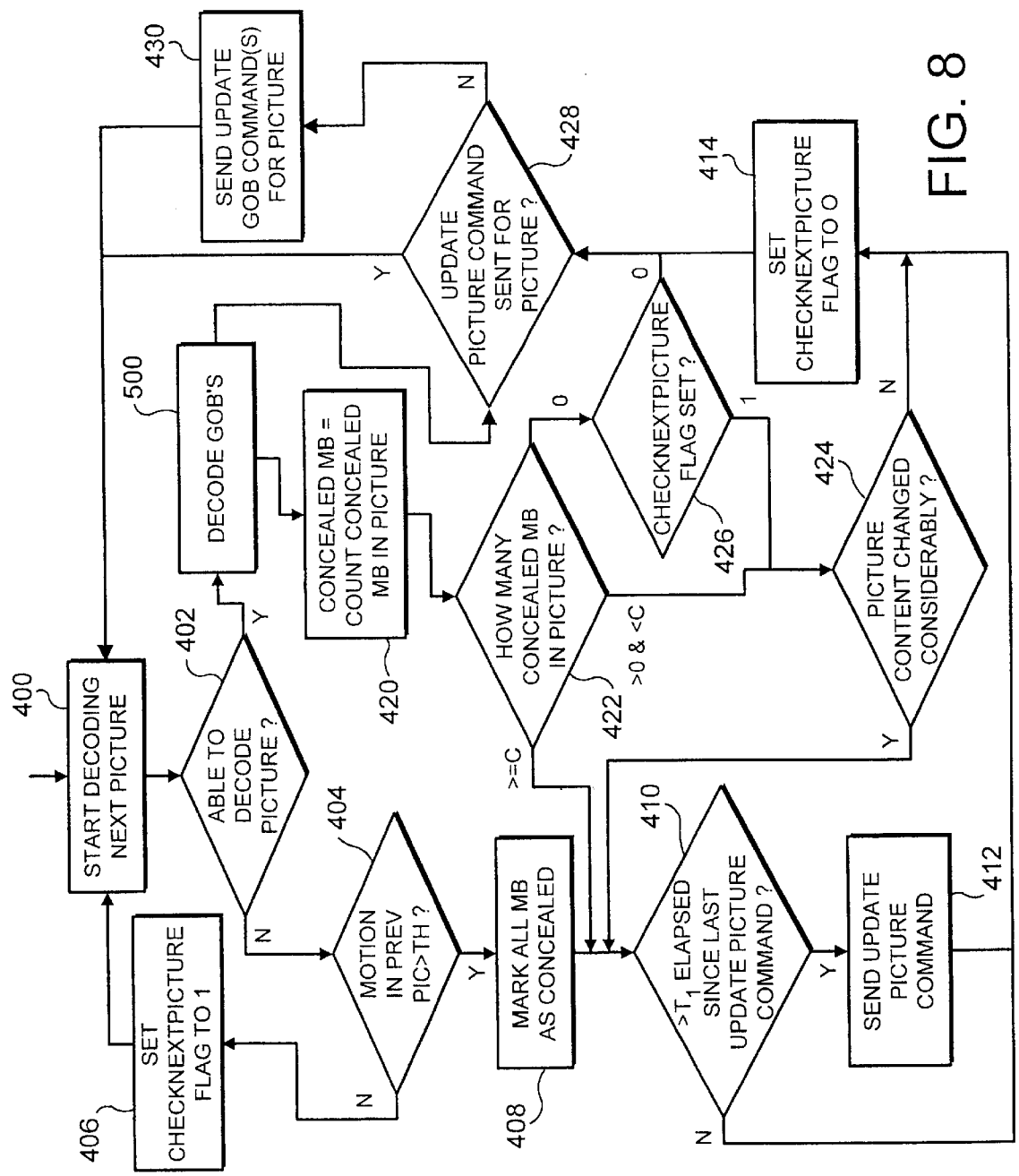
FIG. 8 is a flow diagram showing the operation at the picture level of further embodiment of a video decoder according to the invention.

According to the above-described embodiment, a GOB update command is sent for a GOB unless an update command for the GOB under consideration has already been sent within time $T_2$. Similarly a picture update command is sent for each picture unless such an update command has already been sent within time $T_1$. Thus it is possible to send both GOB update command(s) and a picture update command for the same picture. According to another embodiment of the invention, the update command(s) are generated but are not sent until the entire picture has been decoded (as far as this is possible). If it is decided to send a picture update command for the current picture being decoded then any GOB update command(s) for the same picture are not sent. Thus at step 506 a GOB update command is generated but is not sent and, as shown in FIG. 8, at step 428 the controller 124 determines whether a picture update command has been sent for the current picture being decoded. If so, the GOB update command(s) for the current picture are ignored. If not, the GOB update command(s) for the current picture are sent (430). Decoding of the next picture is then carried out (400).

The operation of the encoder part of the video codec of the transmitting terminal 2 will now be described. The first picture is encoded as an intra-frame with the subsequent frames being coded as inter-frames until either a scene change causes an intra-frame to be coded, or a forced update is initiated as set by the pre-determined parameters of the encoder or an update message is received from the receiving terminal 1.

When the transmitting terminal 2 receives an update message, the encoder part responds by updating the part of the picture requested in the message from the receiving terminal 1. Thus if the receiving terminal 1 has sent a videoFastUpdatePicture command, the encoder of the transmitting terminal 2 updates the whole of the picture. If the receiving terminal 1 has sent a videoFastUpdateGOB command, the encoder of the transmitting terminal 2 updates the whole of the GOB.

Figure 9:
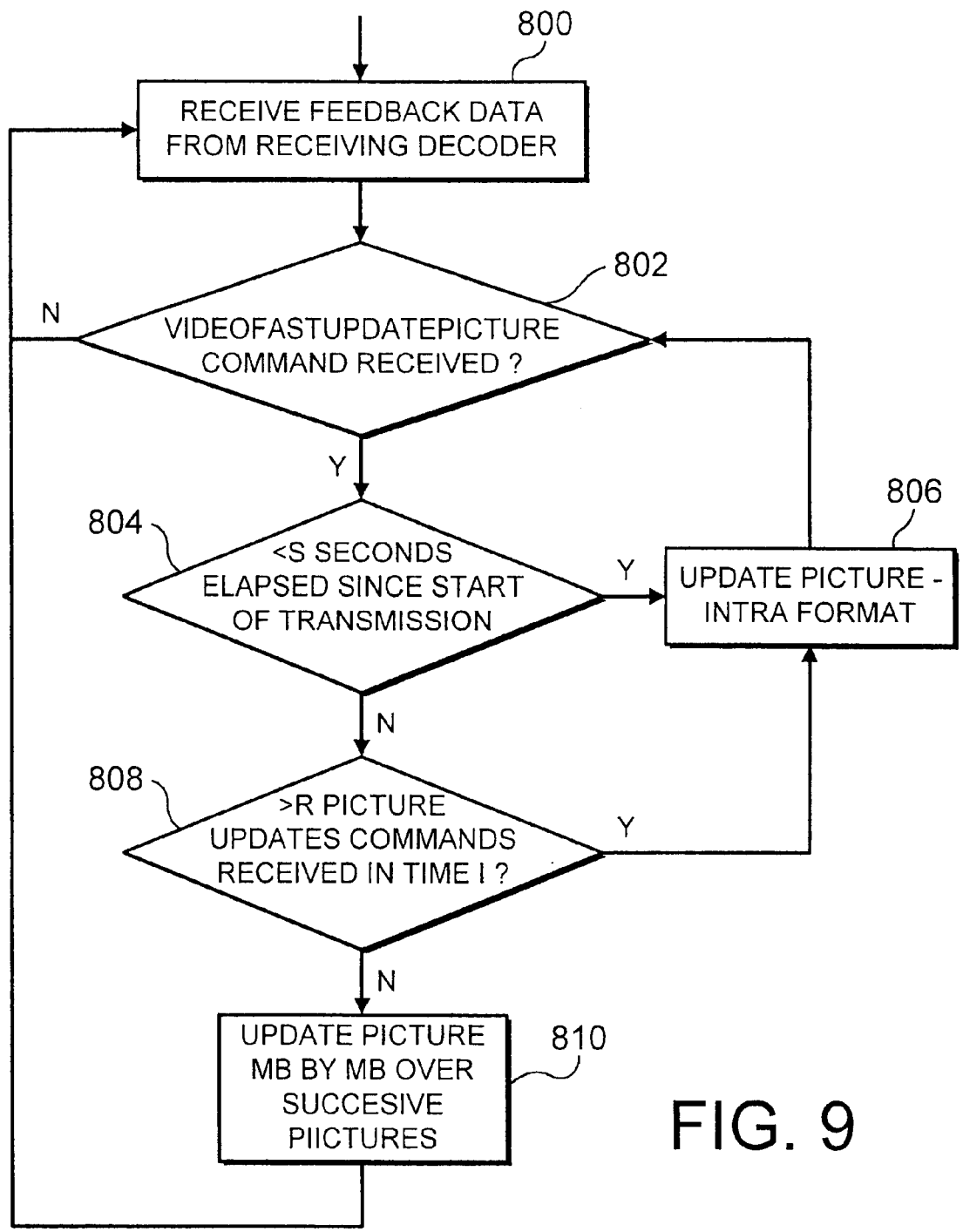
FIG. 9 is a flow diagram showing the operation at the picture level of a video encoder according to the invention.

FIG. 9 is a flow diagram showing the how an encoder according to the invention reacts to a picture update (videoFastUpdatePicture) command. The transmitting terminal 2 monitors (800) codec feedback messages (e.g. sent via a H.245 control channel) from the receiving terminal 1 by means of the control manager 40 and the controller 105 of the video codec. When an update command is received (802) by the encoder 100 the controller 105 checks (804) whether this is within S seconds (e.g. 5 seconds) of the start of transmission. If so the controller instructs (806) the encoder to update the whole picture in intra-coded format. This causes switch 102 to switch out the subtractor 106 and the encoder 100 to encode the whole of the next picture of the incoming video from the input 101 as an intra-frame.

If more than S seconds have elapsed when a picture update command is received, the controller 105 determines (808) whether the transmitting terminal 2 has received more than R update requests in a predetermined period I. If so, the controller switches the switch 102 to intra-mode and the whole picture is updated in intra-coded format (806). Otherwise the controller enables the intra-mode state of the switch 102 on a macroblock-by-macroblock basis (810) such that all macroblocks are encoded in intra-format on a macroblock-by-macroblock basis over successive pictures. If the encoder is pre-programmed in this way, such that the default update process (after the first S seconds) is to update on a macroblock-by-macroblock basis, and the receiving decoder does not accept successive macroblock updating, the receiving decoder will send many videoFastUpdatePicture commands to the transmitting encoder. The operational step 808 therefore ensures that the encoder will eventually update the entire picture in intra-format. Appropriate values for R and I are 10 and 5 seconds respectively.

Figure 10:
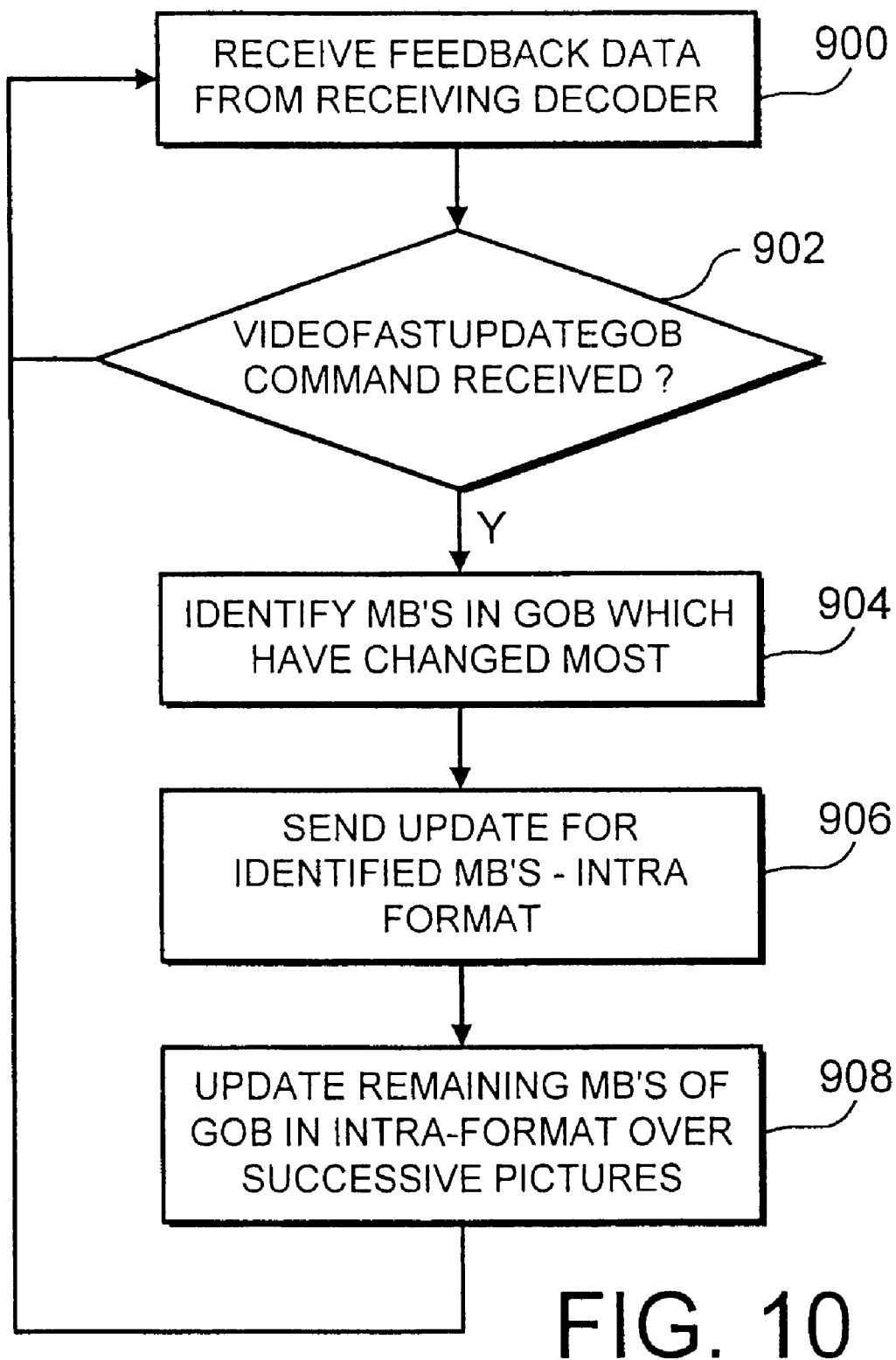
FIG. 10 is a flow diagram showing the operation at the GOB level of a video encoder according to the invention

FIG. 10 is a flow diagram showing how the encoder 100 of the transmitting terminal 2 reacts to a videoFastUpdateGOB command. Feedback messages sent from the receiving terminal 1 (e.g. via a H.245 control channel) are monitored (900) by the control manager 40 and the controller 105 of the encoder part 100 of the transmitting terminal 2. When a videoFastUpdateGOB command is received (902) by the encoder 100 the controller 105 identifies (904) those macroblocks of the GOB requested which have changed the most. Those MBs of the GOB which have changed most are updated first (906) by intra-coding. These MBs can be identified by considering, pixel by pixel, the luminance values of the pixels of a MB of the GOB of the next picture to be encoded and a previous picture. A sum of the square of the differences between the pixels of the next picture and the previous picture is formed. The encoder encodes, in intra-mode, those MBs that have the highest differences first. The other MBs of the GOB are updated during coding of the corresponding MB in the corresponding GOB in the following pictures.

The controller 105 of the encoder 100 also tracks the temporal propagation of corrupted MBs. Thus when a videoFastUpdateGOB command is received, the encoder can also update those MBs that were predicted from the corrupted GOB for which a videoFastUpdateGOB command has been sent from the decoder.

What is claimed is:

1. A method of video coding comprising:

receiving encoded video data by a video decoder;

decoding said video data to form decoded video data representing successive pictures of a video sequence; and determining if the decoded video data contains an error and, when it is determined that an error is present, sending an update message from said video decoder to a transmitting video encoder requesting an update of at least a portion of the video data containing the error, wherein a further update message for a corresponding portion of the video data is transmitted from said video decoder to said video encoder if a predetermined time period has elapsed as measured from a point in time when said update message was transmitted from said video decoder to said transmitting video encoder, thereby limiting unnecessary transmission of update messages by performing transmission of said further update message after said predetermined time period has elapsed.

2. A method according to claim 1 wherein the update message requests the update of an entire picture of the video sequence.

3. A method according to claim 2, wherein the predetermined period is proportional to the round-trip delay between the video decoder and the video encoder.

4. A method according to claim 2, wherein the step of determining if the decoded video contains an error comprises determining the amount of change in the video data as compared with previous picture data for a corresponding area of a video image, the update message being generated if the amount of change exceeds a pre-determined threshold.

5. A method of video decoding according to claim 2, wherein an update message is generated if the amount of motion in a previous picture exceeds a pre-determined threshold.

6. A mobile radio device operating according to the decoding method of claim 2.

7. A method according to claim 1 wherein the update message requests the update of a segment of a picture of the video sequence.

8. A method according to claim 7, wherein the predetermined period is proportional to the round-trip delay between the video decoder and the video encoder.

9. A method according to claim 7, wherein the step of determining if the decoded video contains an error comprises determining the amount of change in the video data as compared with previous picture data for a corresponding area of a video image, the update message being generated if the amount of change exceeds a pre-determined threshold.

10. A method of video decoding according to claim 7, wherein an update message is generated if the amount of motion in a previous picture exceeds a pre-determined threshold.

11. A mobile radio device operating according to the decoding method of claim 7.

12. A method according to claim 1, wherein the predetermined period is proportional to the round-trip delay between the video decoder and the video encoder.

13. A method according to claim 12, wherein the step of determining if the decoded video contains an error comprises determining the amount of change in the video data as compared with previous picture data for a corresponding area of a video image, the update message being generated if the amount of change exceeds a pre-determined threshold.

14. A method of video decoding according to claim 12, wherein an update message is generated if the amount of motion in a previous picture exceeds a pre-determined threshold.

15. A mobile radio device operating according to the decoding method of claim 12.

16. A method according to claim 1, wherein the step of determining if the decoded video contains an error comprises determining the amount of change in the video data as compared with previous picture data for a corresponding area of a video image, the update message being generated if the amount of change exceeds a pre-determined threshold.

17. A method of video decoding according to claim 16, wherein an update message is generated if the amount of motion in a previous picture exceeds a pre-determined threshold.

18. A mobile radio device operating according to the decoding method of claim 16.

19. A method of video decoding according to claim 1, wherein an update message is generated if the amount of motion in a previous picture exceeds a pre-determined threshold.

20. A mobile radio device operating according to the decoding method of claim 19.

21. A method according to claim 1, wherein said determining step comprises the step of:

determining for an area of a first picture the amount of change in the video data as compared with video data for a corresponding area of a previous picture.

22. A mobile radio device operating according to the decoding method of claim 21.

23. A method according to claim 1, wherein said determining step comprises:

determining if the decoded video data contains an error and, if so, concealing an area of the picture containing the error.

24. A method of video decoding according to claim 23, wherein when it is determined that an error is present such that a picture cannot be decoded, all the parts of the picture are labeled as being concealed and the next picture is decoded.

25. A mobile radio device operating according to the decoding method of claim 23.

26. A mobile radio device operating according to the decoding method of claim 24.

27. A mobile radio device operating according to the decoding method of claim 1.

28. A method of encoding a video signal comprising receiving a video signal to be encoded;

encoding the video signal to form encoded video data; and transmitting the encoded video data to a remote video decoder, wherein the encoding is responsive to an update control signal received from a remote video decoder to update requested encoded video data in a progressive manner over a plurality of pictures, and wherein a further update control signal for a corresponding portion of the requested encoded video data in which an error was detected is transmitted from said remote video decoder if a predetermined time period has elapsed as measured from a point in time when said update control signal was transmitted from said remote video decoder, thereby limiting unnecessary transmission of update control signals by performing transmission of said further update control signal after said predetermined time period has elapsed.

29. A method of encoding a video signal according to claim 10 wherein the updating is carried out on a macroblock-by-macroblock basis, the updated macroblocks being updated over sequential pictures of the video signal.

30. A mobile radio device operating according to the method of encoding according to claim 29.

31. A mobile radio device operating according to the method of encoding according to claim 28.

32. A video decoding apparatus comprising:

means for receiving encoded video data;

means for decoding said video data to form decoded video data;

means for determining if the decoded video data contains an error; and means for sending an update message to a transmitting video encoder requesting an update of at least a portion of the video data containing the error, wherein a further update message for a corresponding portion of the video data is transmitted from said video decoding apparatus if a predetermined time period has elapsed as measured from a point in time when said update message was transmitted from said video decoding apparatus to said transmitting video encoder, thereby limiting unnecessary transmission of update messages by performing transmission of said further update message after said predetermined time period has elapsed.

33. Apparatus according to claim 32 wherein means for determining if the decoded video contains an error comprises means for determining the amount of change in the video data as compared with previous picture data for a corresponding area of a video image, the update message being sent if the amount of change exceeds a pre-determined threshold.

34. Apparatus according to claim 33, wherein an update message is generated if the amount of motion in a previous picture exceeds a predetermined threshold.

35. A mobile radio device comprising decoding apparatus according to claim 33.

36. Apparatus according to claim 32, wherein an update message is generated if the amount of motion in a previous picture exceeds a predetermined threshold.

37. A mobile radio device comprising decoding apparatus according to claim 36.

38. A mobile radio device comprising decoding apparatus according to claim 32.

39. Video signal encoding apparatus comprising:

means for receiving a video signal to be encoded;

means for encoding the video signal to form encoded video data; and means for transmitting the encoded video data to a remote video decoder, wherein said encoding means is responsive to an update control signal received from a remote video decoder to update requested encoded video data in a progressive manner over a plurality of pictures, and wherein a further update control signal for a corresponding portion of the encoded video data in which an error was detected is transmitted from said remote video decoder if a predetermined time period has elapsed as measured from a point in time when said update control signal was transmitted from said remote video decoder, thereby limiting unnecessary transmission of update control signals by performing transmission of said further update control signal after said predetermined time period has elapsed.

40. Apparatus according to claim 39 wherein the updating is carried out on a macroblock-by-macroblock basis, the updated macroblocks being updated over sequential pictures of the video signal.

41. A mobile radio device comprising encoding apparatus according to claim 40.

42. A mobile radio device comprising encoding apparatus according to claim 39.

* * * * *